(12) United States Patent
Schlittenbauer et al.

(10) Patent No.: US 12,276,353 B2
(45) Date of Patent: Apr. 15, 2025

(54) SYSTEM FOR REGULATING THE FLOW OF A FLUID

(71) Applicant: AUDI AG, Ingolstadt (DE)

(72) Inventors: Lena Schlittenbauer, Altmannstein (DE); Klaus Ternovan, Oberostendorf (DE); Herbert Tschentscher, Riedenburg (DE)

(73) Assignee: AUDI AG, Ingolstadt (DE)

( * ) Notice: Subject to any disclaimer, the term of this patent is extended or adjusted under 35 U.S.C. 154(b) by 36 days.

(21) Appl. No.: 18/187,556

(22) Filed: Mar. 21, 2023

(65) Prior Publication Data

US 2023/0304599 A1    Sep. 28, 2023

(30) Foreign Application Priority Data

Mar. 22, 2022  (DE) .............. 10 2022 106 609.6

(51) Int. Cl.
*F16K 17/36* (2006.01)
*F16K 31/163* (2006.01)
*F16K 31/165* (2006.01)

(52) U.S. Cl.
CPC .......... *F16K 31/1635* (2013.01); *F16K 17/36* (2013.01); *F16K 31/1655* (2013.01)

(58) Field of Classification Search
CPC ........... Y10T 137/108; Y10T 137/1098; F16K 17/36
See application file for complete search history.

(56) References Cited

U.S. PATENT DOCUMENTS

| | | | |
|---|---|---|---|
| 3,191,610 A | | 6/1965 | Zeisloft |
| 3,266,506 A | * | 8/1966 | Takahashi .............. G05D 13/00 137/56 |
| 3,294,074 A | * | 12/1966 | Mennicken ............ F02M 23/04 123/585 |
| 3,450,144 A | * | 6/1969 | Joachim .................. F16H 61/00 137/56 |
| 5,398,713 A | | 3/1995 | Whitman |

FOREIGN PATENT DOCUMENTS

| | | |
|---|---|---|
| CN | 113374917 A | 9/2021 |
| CN | 215311597 U | 12/2021 |
| DE | 10 2019 104 109 A | 8/2020 |

OTHER PUBLICATIONS

Office Action, dated Feb. 22, 2023, for German Patent Application No. 10 2022 106 609.6 (7 pages).

* cited by examiner

*Primary Examiner* — Kevin F Murphy
(74) *Attorney, Agent, or Firm* — Seed IP Law Group LLP

(57) ABSTRACT

A system and method for regulating a flow of a fluid, wherein the system comprises a regulating device and a central axis, wherein the regulating device is adapted to establish at least one through-passage opening for the fluid, wherein each time a through-passage opening is situated between two transport ducts for the fluid, wherein a normal vector of a cross sectional surface of the at least one through-passage opening is oriented parallel to the axis, wherein a size of the cross-sectional surface is adjusted in dependence on the rotary speed of the regulating device turning about the central axis.

5 Claims, 10 Drawing Sheets

SYSTEM FOR REGULATING THE FLOW OF A FLUID

BACKGROUND

Technical Field

This disclosure relates to a system for regulating the flow of a fluid and a method for regulating the flow of a fluid.

Description of the Related Art

A centrifugal valve can be used to adjust the flow of a fluid. A valve device having a valve element moving in dependence on centrifugal force is known from the document DE 10 2019 104 109 A1. The document CN 113374917 A describes a highly sensitive proportional valve. A centrifugal valve is described in the document U.S. Pat. No. 5,398,713 A.

BRIEF SUMMARY

Some embodiments provide systems and/or methods to adjust a flow or a current of a fluid in a suitable manner. Some embodiments include systems and/or methods designed to regulate a flow or current of a fluid, such as a liquid or a gas. The system comprises a regulating device and a central axis. The regulating device is adapted to establish and/or provide at least one through-passage opening for the fluid, wherein each time a through-passage opening being established and/or provided is arranged between two transport ducts for the fluid and allows a transport of the fluid between the transport ducts. A normal vector of a cross sectional surface of the at least one through-pas sage opening of the regulating device or a normal vector of a plane in which the cross sectional surface is situated is oriented or directed parallel to the axis of the system, and the cross sectional surface is furthermore extended and/or extensible or to be extended radially with regard to the axis. The size of the cross sectional surface of the through-passage opening is adjusted or may be adjusted or is adjustable in dependence on the rotary speed of the regulating device turning about the central axis in one of two possible oppositely oriented directions during the operation of the system.

During the operation of the system, when it is turning, a centrifugal force acts on the regulation device and thus on the through-passage opening provided by it, which adjusts and thus changes the size of the cross sectional surface in a radial direction with respect to the axis. Depending on the configuration of the regulation device and thus of the system, the cross sectional surface is or becomes larger as the rotary speed is greater. Alternatively, depending on the configuration, it is also possible for the cross sectional surface to become smaller as the rotary speed is greater.

The system furthermore comprises a carrier body, such as a housing, having at least one recess, such as an annular recess, in which the regulating device is integrated or in which it can be received.

At least one of the transport ducts, in one configuration all of the transport ducts, may be oriented parallel to the axis and thus also parallel to the normal vector of the cross sectional surface of the at least one through-passage opening. At least one transport duct may be designed as an annular duct or a duct shaped as the envelope of a cylinder, being situated coaxially to the axis and enclosing it. Alternatively, or additionally, at least one transport duct may be oriented parallel to the axis and may have a cross-sectional surface in the form of an ellipse, such as a circle, or a polygon. It is also possible for at least one cross sectional surface to have an axial extension which is and varies in dependence on the radial distance from the central axis, it being possible for this extension to increase with increasing radial distance from the axis in one embodiment and to decrease with increasing radial distance from the axis in an alternative embodiment.

In one embodiment of the system, the regulating device has a rotationally symmetrical main body, such as an annular one, made from an elastically deformable material, such as an elastomer. In this elastic main body, in one embodiment, there is arranged or integrated at least one deformation region, such as a hollow region or a region formed as a recess, such as a duct and/or borehole. It is also possible for the main body to be situated in an axially oriented recess of the carrier body, such as a rotationally symmetrical one.

Furthermore, it is possible for the at least one transport duct to run through the carrier body, through the main body and/or between the carrier body and the main body, the at least one transport duct and a transition between the main body and the carrier body being joined together. It is possible for the at least one through-passage opening to be arranged optionally between the carrier body and the elastic main body of the regulating device, i.e., at one place on a boundary or the transition between the carrier body and the main body, and to extend in the axial direction between them.

In some embodiments, at least one accessory body may be integrated in the elastically deformable main, having less elasticity or deformability than the main body. Such an accessory body is formed or designated as a mass body, for example. Furthermore, it is possible for the at least one deformation region and the at least one accessory body, such as the mass body, to be radially and/or axially set off from the axis, whereby either the at least one deformation region has a lesser radial distance from the axis than the at least one accessory body or vice versa.

During the operation of the system, the turning main body will be deformed in the radial direction, depending on the rotary speed and the centrifugal force acting on it, whereupon the cross sectional surface of the at least one through-passage opening is accordingly adjusted or adjustable and thus changed or may be changed in the radial direction by deformation of the main body and becomes larger or smaller in the radial direction and depending on the radial speed. This is also the case when the at least one through-passage opening is situated between the main body and the carrier body in the radial direction.

In some embodiments, the carrier body is rigid and has less elasticity than the elastically deformable main body. During the operation of the system, the carrier body generally remains unchanged, while the main body is elastically deformed and changed relative to the axis and the carrier body, depending on the rotary speed, wherein the cross sectional surface of the at least one through-passage opening is varied or is to be varied between the main body and the carrier body in the radial direction and becomes larger or smaller depending on the embodiment.

Alternatively, or additionally, at least one axial and elastically deformable transport duct is led as a regulating duct for the fluid through the main body parallel to the axis and arranged in the main body, it being possible for this at least one transport or regulating duct to run centrally through the main body or to be radially set off from the axis and to have the at least one through-passage opening. This elastically deformable transport duct, enclosed by the elastically deformable main body, is designed to surround and/or bound the at least one through-passage opening.

In some embodiments, the regulating device comprises at least one mechanical arrangement, which in turn comprises a piston and a spring for a respective through-passage opening, the piston being stressed or meant to be stressed by the spring, while the piston is radially displaceable or to be displaced or is displaced by the spring perpendicular to the axis and thereby is moved relative to the respective through-passage opening and is adapted to closing entirely or at least partially, or opening or opening completely, this through-passage opening depending on the rotary speed-dependent position of the piston relative to the axis and relative to the through-passage opening. It is possible to arrange either the spring between the axis and the piston, or to arrange the piston between the axis and the spring. This mechanical arrangement is situated each time in a radial transport duct as a recess in the carrier body.

Regardless of whether the regulating device, and thus the system, comprises the elastic main body or the at least one mechanical arrangement, the cross sectional surface of the at least one through-passage opening changes in the radial direction upon changing rotary speed perpendicular to the axis. At constant rotary speed, a constant cross sectional surface may be established.

The method according to the disclosure is designed to regulate a flow of a fluid with a regulating device and furthermore with an embodiment of the proposed system having such a regulating device. With the regulating device used in this way, at least one through-passage opening for the flowing fluid is established and/or provided. Each time a through-passage opening is arranged or will be arranged between two respective transport ducts for the fluid, and each time a through-passage opening is situated between two respective transport ducts. Moreover, a cross sectional surface of the at least one through-passage opening may be arranged in a plane, and a normal vector of the cross sectional surface or the plane is or will be oriented parallel to the axis, the cross-sectional surface furthermore being extended parallel to a radial direction and parallel to a tangential direction of the rotating regulating device and thus the rotating system. Furthermore, the size of the cross sectional surface is established and/or provided at least in the radial direction in dependence on the rotary speed of the regulating device turning about the central axis during the operation of the system, usually being changed in dependence of the rotary speed.

It is possible for the size of the cross sectional surface to have a starting value for a rotary speed of zero revolutions per minute. In one embodiment of the method, it is possible for such a starting value to correspond to a minimum value, possibly to a value of zero, for the static nonmoving regulating device, and accordingly only a minimal quantity of the fluid can flow through the at least one through-passage opening, the size of the cross sectional surface of the at least one through-passage opening increasing in the radial direction with increasing rotary speed of the rotating regulating device, while also the quantity of fluid flowing through the at least one through-passage opening is increased. If the size of the cross sectional surface should be zero in the static state, it is closed and will only be opened and thus provided and established accordingly, at least in the radial direction with increasing rotary speed, while in the static state at first no fluid at all can flow through the closed through-passage opening, and the fluid can only flow at all if the through-passage opening is rotating. On the other hand, it is possible for the starting value for the size of the cross sectional surface to have a maximum value in the static state of the regulating device, and for the size to decrease at least in the radial direction with increasing rotary speed, while the quantity of fluid flowing through will also be decreased accordingly.

The proposed regulating device is operated by centrifugal force, the quantity of fluid flowing through the at least one through-passage opening being dependent on the rotary speed of the regulating device. The system and/or the regulating device of the system may be called a centrifugal force valve. Furthermore, it is also possible to regulate a pressure and/or a volume flow of the fluid thanks to the centrifugal forces arising during the rotary movement of the regulating device. In one embodiment, the regulating device is turned by a shaft, which is situated coaxial to the axis. Such a shaft is designed, for example, as a component of a rotating structural part, such as the above-described carrier body, which drives and thus turns the regulating device.

Thus, no sensors or actuators are needed to establish a flow of the fluid. A value, such as a particular required nominal value, for the flow, i.e., the pressure, the quantity, or the volume flow rate of the fluid, is dependent on the layout of the regulating device, such as the shape of the elastic main body and/or its elasticity. It is possible for the elasticity of the main body provided in one embodiment to be either homogeneous or to vary in dependence on the radius, depending on the radius with regard to the axis. The elasticity in another embodiment is dependent on the density of the main body and/or the arrangement and/or positioning of the at least one deformation region integrated in it and/or the at least one accessory body depending on the radial distance relative to the axis. A characteristic curve for the rotary speed-dependent regulating of the flow of the fluid, describing the dependency of the pressure and/or the volume flow rate on the rotary speed, is contingent upon the particular design of the regulating device. It is also possible for a particular characteristic of the rotary speed to be a curve or a line. It is possible to integrate the regulating device and thus the system in an existing rotary arrangement and thus retrofit that arrangement.

Of course, the above mentioned features and the features yet to be explained below can be used not only in the particular indicated combination, but also in other combinations or standing alone.

BRIEF DESCRIPTION OF THE SEVERAL VIEWS OF THE DRAWINGS

Embodiments are presented schematically with the aid of the drawings and described schematically and at length with reference to the drawings.

DETAILED DESCRIPTION

Figure 1A:
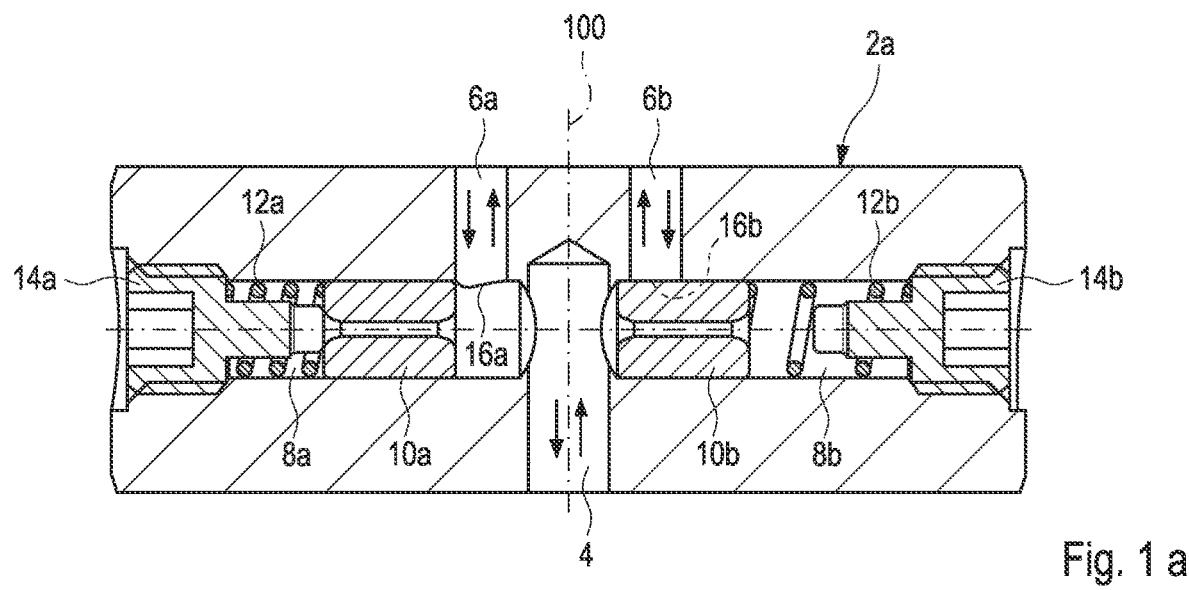
FIGS. 1a and 1b show in schematic representation a first embodiment of a system according to the disclosure to carry out a first embodiment of a method according to the disclosure.
Figure 1B:
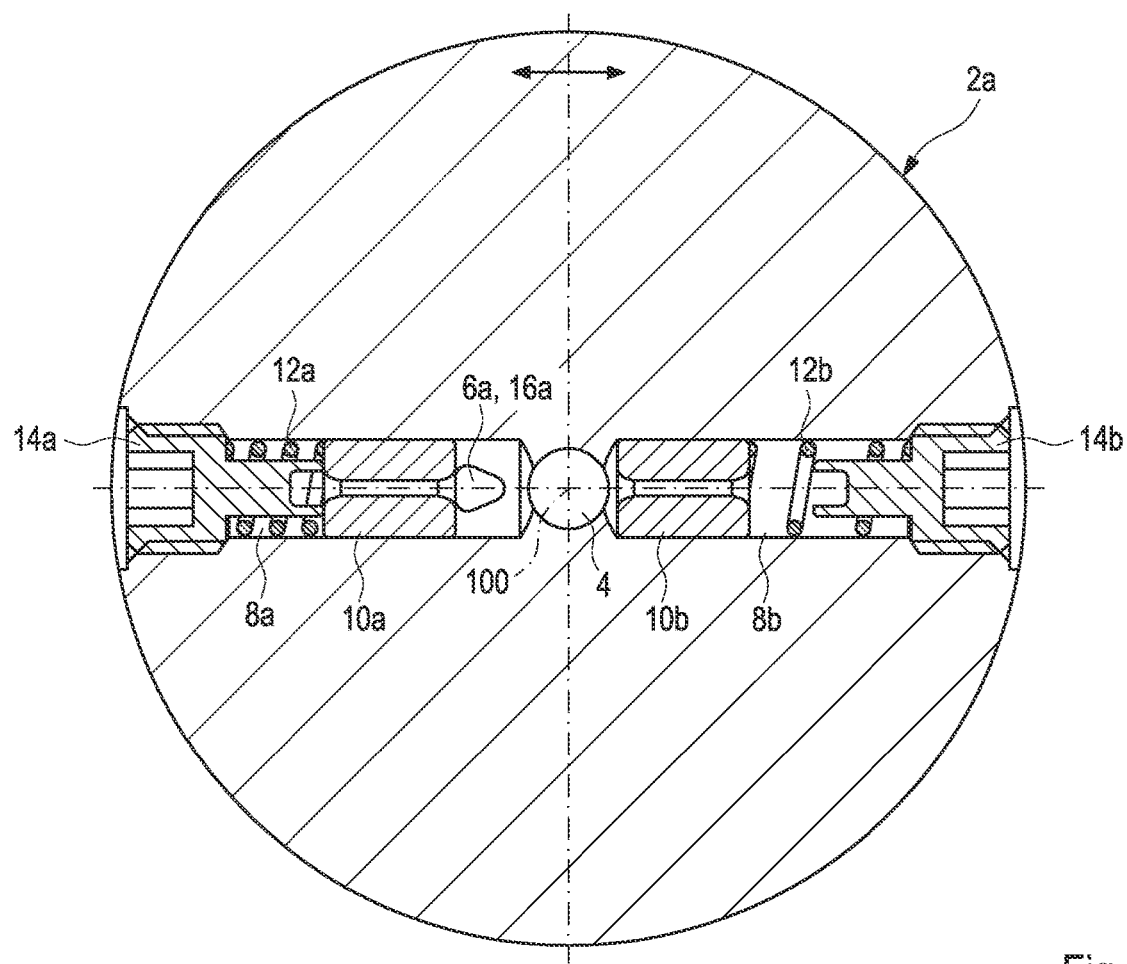

The first embodiment of the system is shown schematically in FIG. 1a in a cross section through a central axis 100 of this system and in FIG. 1b perpendicular to this central axis 100. The second embodiment of the system is shown schematically in FIG. 2a in a cross section through a central axis 100 of this system and in FIG. 2b perpendicular to this central axis 100.

The first and second embodiment of the system can also be configured or designated as a mechanical embodiment of the system. The first and second embodiment of the system comprise a rigid carrier body 2a or 2b, here designated or configured as a housing. In the carrier body 2a, 2b there is arranged a central axially oriented and cylinder-shaped transport duct 4, although it only passes partly through this carrier body 2a, 2b, the transport duct 4 being bounded by a wall inside the carrier body 2a, 2b. Furthermore, two radial transport ducts 8a, 8b are arranged in the carrier body 2a, 2b, being oriented perpendicular to the axis 100, each being connected to the central transport duct 4 and extending radially outward from the central transport duct 4 and having a cylinder shape. Each radial transport duct 8a, 8b is formed as a recess to receive a respective regulating device, being a mechanical device in the present case. Furthermore, each time a decentral and axially oriented transport duct 6a, 6b or 6c, 6d is connected to a respective radially oriented transport duct 8a, 8b. In the first embodiment of the system, the two decentral axial transport ducts 6a, 6b have a shorter distance from the axis 100 than the two decentral axial transport ducts 6c, 6d of the second embodiment of the system.

Each mechanical regulating device arranged in a radially oriented transport duct 8a, 8b comprises a piston 10a, 10b, a spring 12a, 12b and a locking screw 14a, 14b, each time the piston 10a, 10b having a smaller radial distance from the axis 100 than the respective locking screw 14a, 14b, while the spring 12a, 12b is arranged between the piston 10a, 10b and the locking screw 14a, 14b. Furthermore, each through-passage opening 16a, 16b, 16c, 16d of the system is dictated by a geometry of a respective decentral transport duct 6a, 6b, 6c, 6d, the through-passage opening 16a, 16b, 16c, 16d forming at the same time a transition between a respective decentral transport duct 6a, 6b, 6c, 6d and a radial transport duct 8a, 8b. Moreover, a normal vector of a cross sectional surface of the through-passage opening 16a, 16b, 16c, 16d is oriented parallel to the central axis 100.

Figure 2:
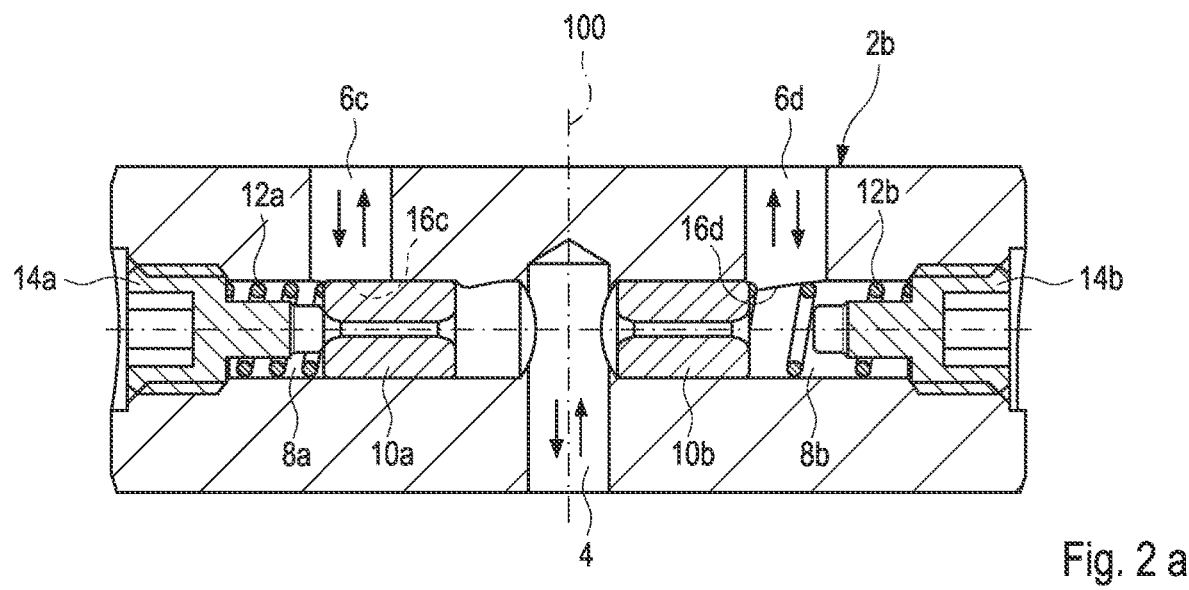
FIGS. 2a and 2b show in schematic representation a second embodiment of the system according to the disclosure to carry out a second embodiment of the method according to the disclosure.
Figure 2:
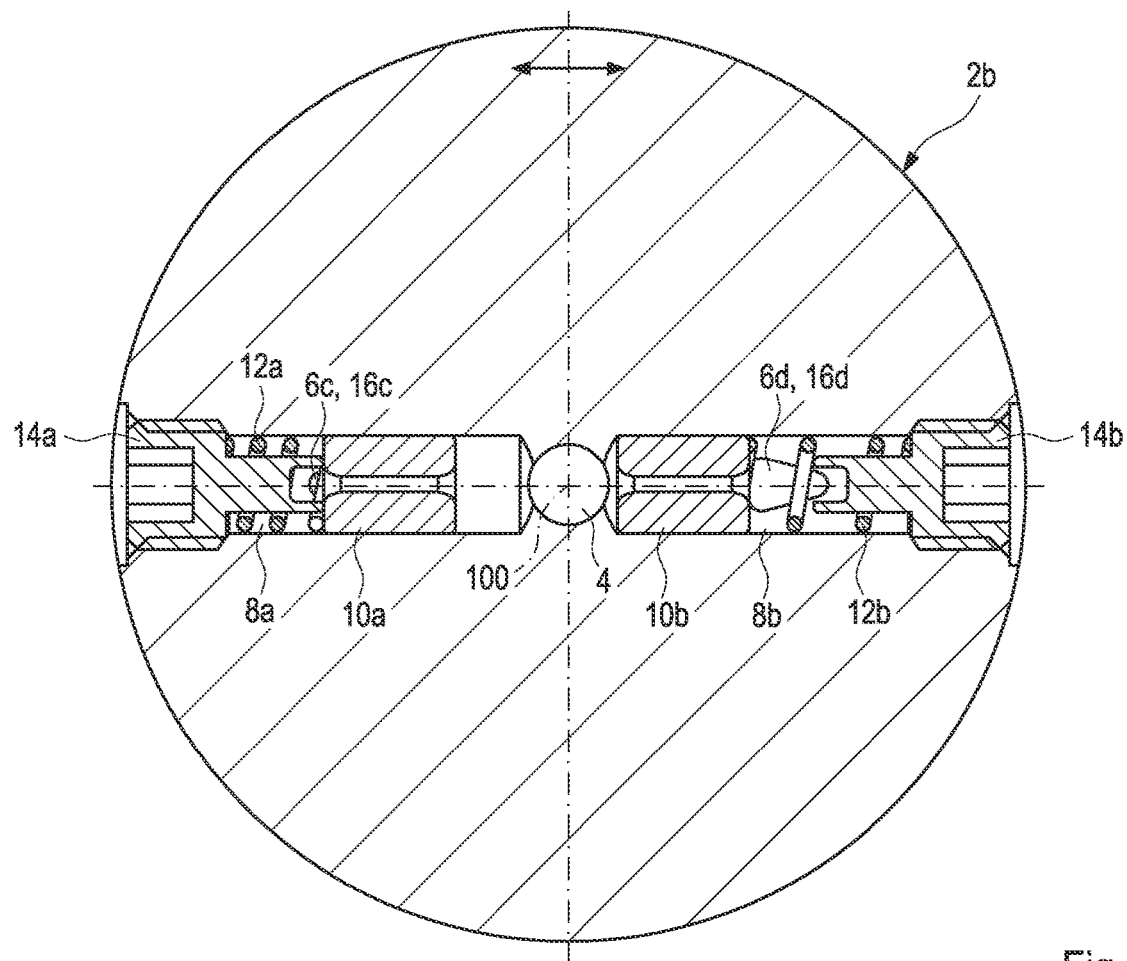

In FIG. 1b and FIG. 2b, there is indicated by a double arrow the direction of turning of the carrier body 2a, 2b about the central axis 100. Furthermore, arrows in FIGS. 1b and 2b which are associated with respective axially oriented transport ducts 4, 6a, 6b, 6c, 6d show that a fluid during operation of the system can flow in two possible opposite directions through these axial transport ducts 4, 6a, 6b, 6c, 6d. In an embodiment of the method, the piston 10a, 10b by virtue of centrifugal force arising upon rotation of the carrier body 2a, 2b is pushed outward from the central axis 100 dependent on the rotary speed, while the spring 12a, 12b acts against the respective displacement of the piston 10a, 10b. Depending on the rotary speed-dependent position of the piston 10a, 10b, a respective through-passage opening 16a, 16b, 16c, 16d of a duct 6a, 6b, 6c, 6d is completely closed in the radial direction with respect to the axis 100, the flow of fluid being prevented, or it is partly closed or opened, or it is completely opened, while in the latter case the maximum quantity of fluid can flow through the through-passage opening 16a, 16b, 16c, 16d.

In the first and second embodiment of the system, it is provided that a radial position of a first piston 10a results in FIG. 1a, 1b or 2a, 2b to the left of the axis 100 at a high rotary speed of the system, such as the maximum speed, and a radial position of a second piston 10b results in FIG. 1a, 1b or 2a, 2b to the right of the axis 100 at a high rotary speed of the system, such as the minimum speed. In the first embodiment of the system and thus of the method (FIG. 1a, 1b), the through-passage opening 16a of the transport duct 6a is freed up and completely opened at the high rotary speed by the radially outward displaced piston 10a, while the through-passage opening 16b of the transport duct 6b at the low rotary speed is completely closed by the radially inward displaced piston 10b. Conversely, in the second embodiment of the system and the method, as indicated by FIG. 2a, 2b, a through-passage opening 16c of the transport duct 6c at a high rotary speed is completely closed by the piston 10a in the radial transport duct 8a. On the contrary, a through-pas sage opening 16d of the transport duct 6d at low rotary speed is freed up and thus opened on account of the resulting position of the piston 10b in the radially oriented duct 8b.

As indicated by FIG. 1a and 2a, two opposite directions are possible for the flowing fluid. In one embodiment, however, it is provided that the fluid at first flows through the central transport duct 4 and, depending on the respective position of the piston 10a, 10b, then across a respective radial transport duct 8a, 8b through the through-passage opening 16a, 16b, 16c, 16d and through a respective transport duct 6a, 6b, 6c, 6d, at a distance from the central axis 100. In this case, a current of flow of the fluid or of a corresponding medium is assisted by the centrifugal force acting upon it.

A rotary speed-dependent characteristic for a flow or a flowing quantity of the fluid moving through the particular system furthermore depends on the geometry of the transport ducts 4, 6a, 6b, 6c, 6d or their through-passage opening 16a, 16b, 16c, 16d, while a normal vector of a cross sectional surface of the through-passage opening 16a, 16b, 16c, 16d is parallel to the axis 100, while the respective through-passage opening 16a, 16b, 16c, 16d is formed here as drop-shaped by definition and thus as a tapering circle at a first end and as an obtuse circle at the second opposite end.

In the first embodiment of the system (FIG. 1b), a through-passage opening 16a, 16b of a decentral transport duct 6a, 6b has an axially oriented extension, the cross sectional surface of which increases from a minimal value at the pointed first end with increasing radial distance from the central axis 100 to the second obtuse end. Conversely, in the second embodiment of the system (FIG. 2b), it is proposed that the axial extension of the cross-sectional surface of a through-passage opening 16c, 16d of a respective decentral transport duct 6c, 6d decreases from a maximum value at the obtuse second end with increasing radial distance from the central axis 100 to the first pointed end.

Moreover, the characteristic of the mass of the piston 10a, 10b is dependent on a characteristic of the spring 12a, 12b, which describes the dependency of a force of the spring 12a, 12b acting on the piston 10a, 10b, and/or on the respective length or extension of the spring 12a, 12b. Furthermore, the characteristic for the volume flow rate of the fluid is dependent on the texture in the interior wall of the respective transport duct 4, 6a, 6b, 6c, 6d and thus the respective surface quality of the sliding surface of the respective transport duct 4, 6a, 6b, 6c, 6d and on the viscosity of the fluid. In both embodiments presented here, the pistons 10a, 10b are cylinder shaped, as an example. However, it is also possible for a particular piston 10a, 10b to be ball shaped, for example. Accordingly, the springs 12a, 12b are configured here, for example, as cylindrical compression springs. However, it is also conceivable for a spring 12a, 12b to be formed alternatively as a tension spring. Generally, each system has at least one radially oriented transport duct 8a, 8b to receive a respective regulating device. However, it is also possible to provide more than two such radial ducts 8a, 8b for the same number of regulating devices in a respective carrier body 2a, 2b.

In the first embodiment of the method with the first embodiment of the system, a volume flow rate or a quantity of the flowing fluid is accordingly increased by the increasing cross sectional surface of the through-passage opening 16a, 16b of the transport duct 6a, 6b with increasing rotary speed and/or a pressure of the fluid flowing through the through-passage opening 16a, 16b is reduced. In the second embodiment of the method with the second embodiment of the system, the volume flow rate or the quantity of the flowing fluid is throttled by the decreased through-passage opening 16c, 16d of the transport duct 6c, 6d with increasing rotary speed and/or a pressure of the fluid flowing through the through-passage opening 16c, 16d is increased.

Figure 3:
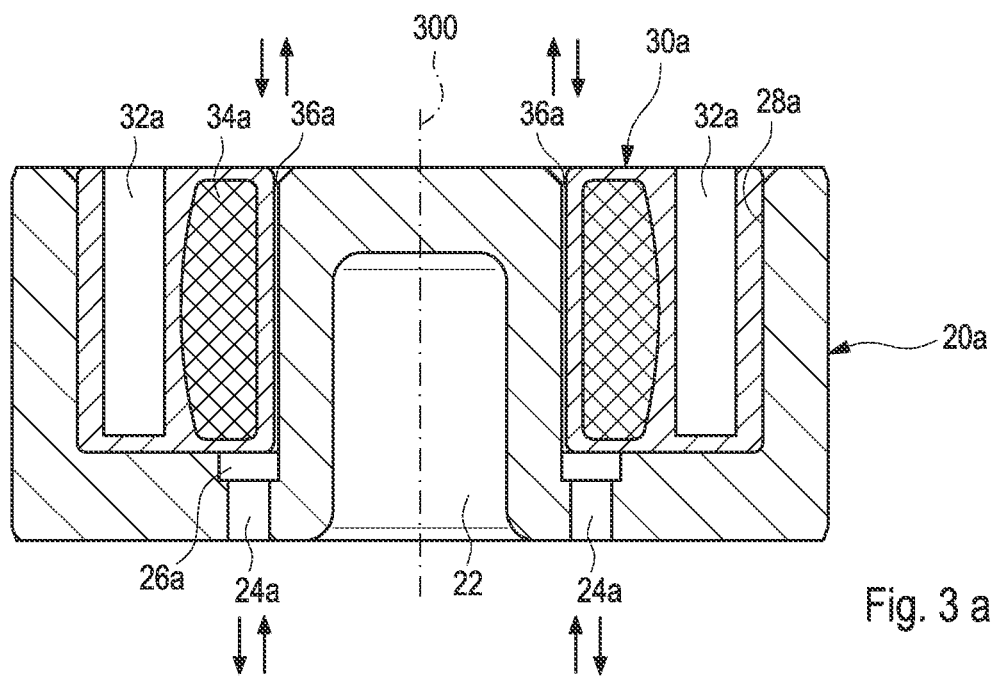
FIGS. 3a and 3b show in schematic representation a third embodiment of the system according to the disclosure to carry out a third embodiment of the method according to the disclosure.
Figure 3:
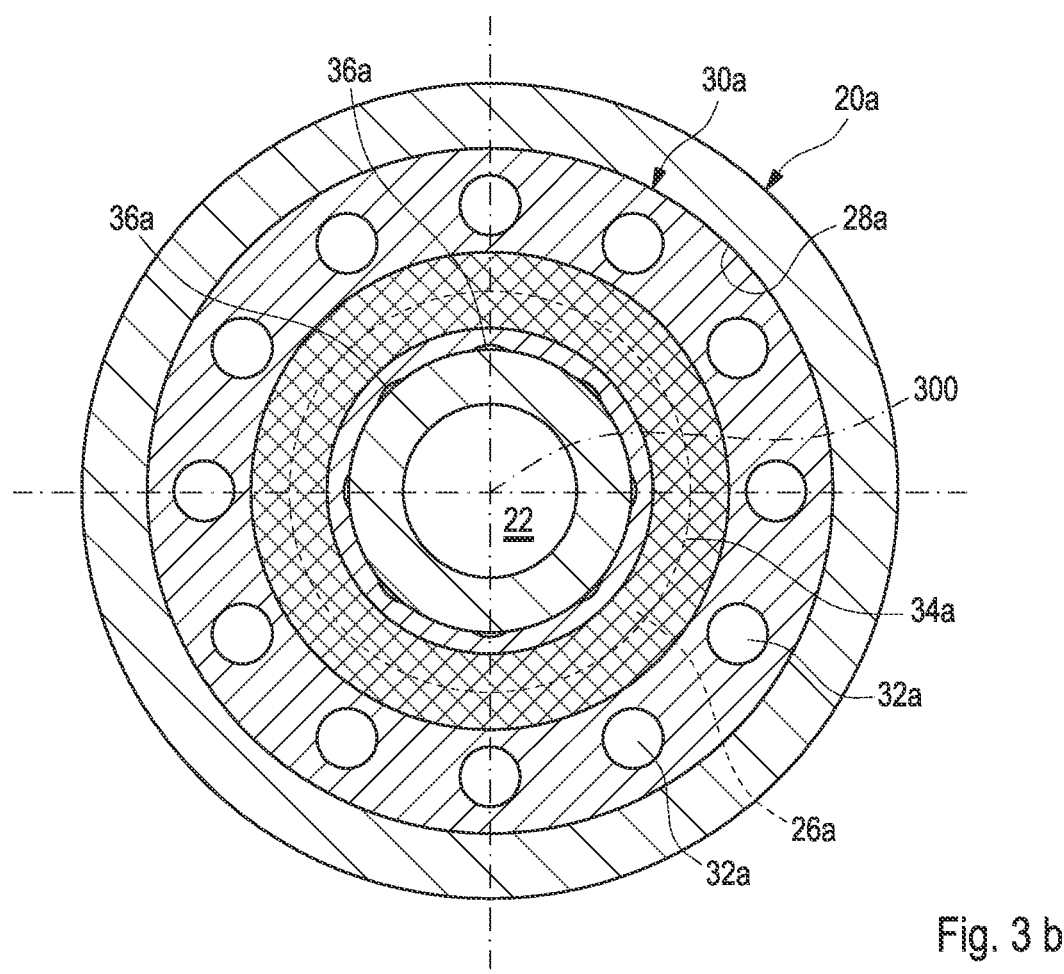
Figure 4:
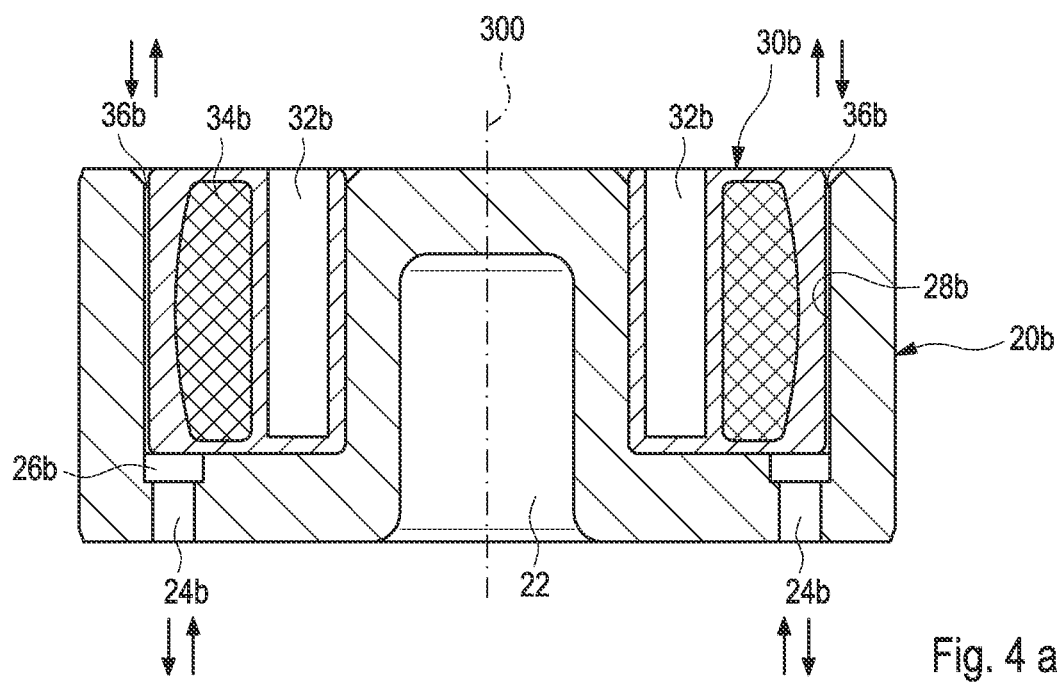
FIGS. 4a and 4b show in schematic representation a fourth embodiment of the system according to the disclosure to carry out a fourth embodiment of the method according to the disclosure.
Figure 4:
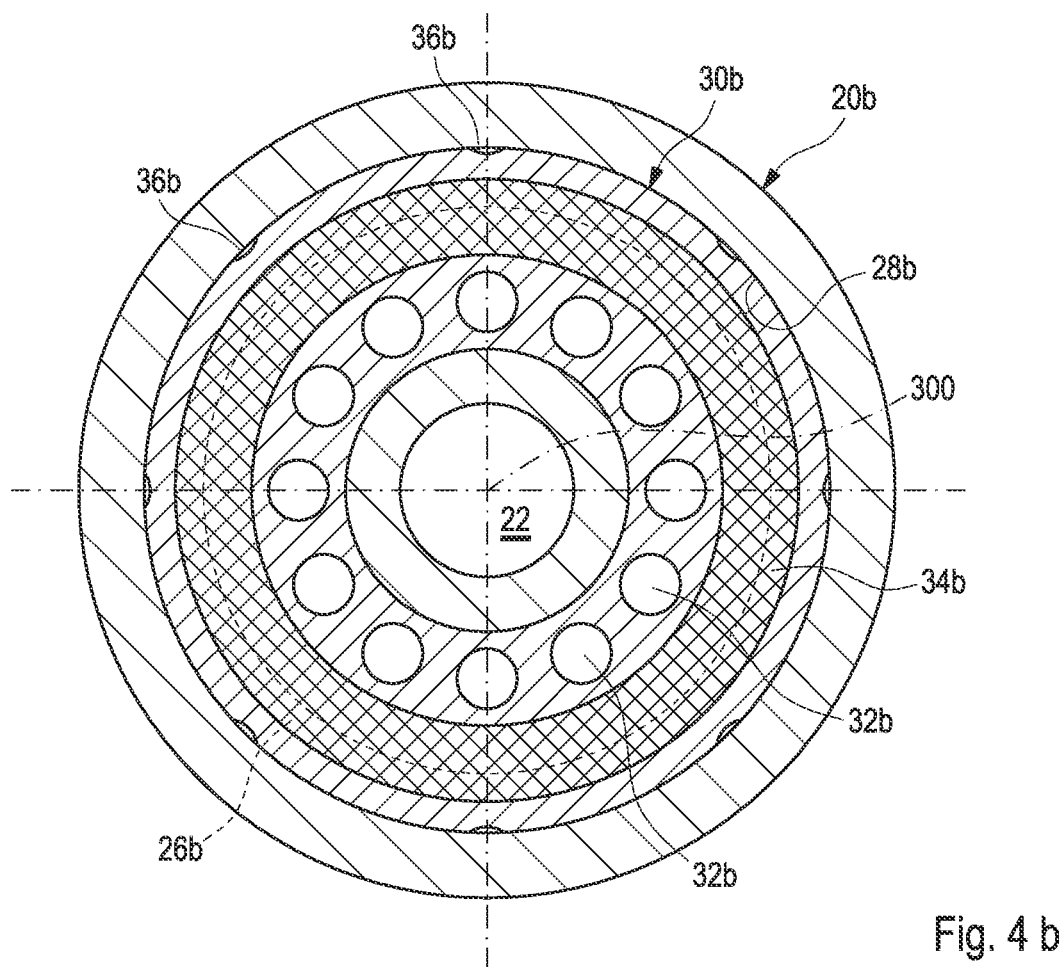
Figure 5A:
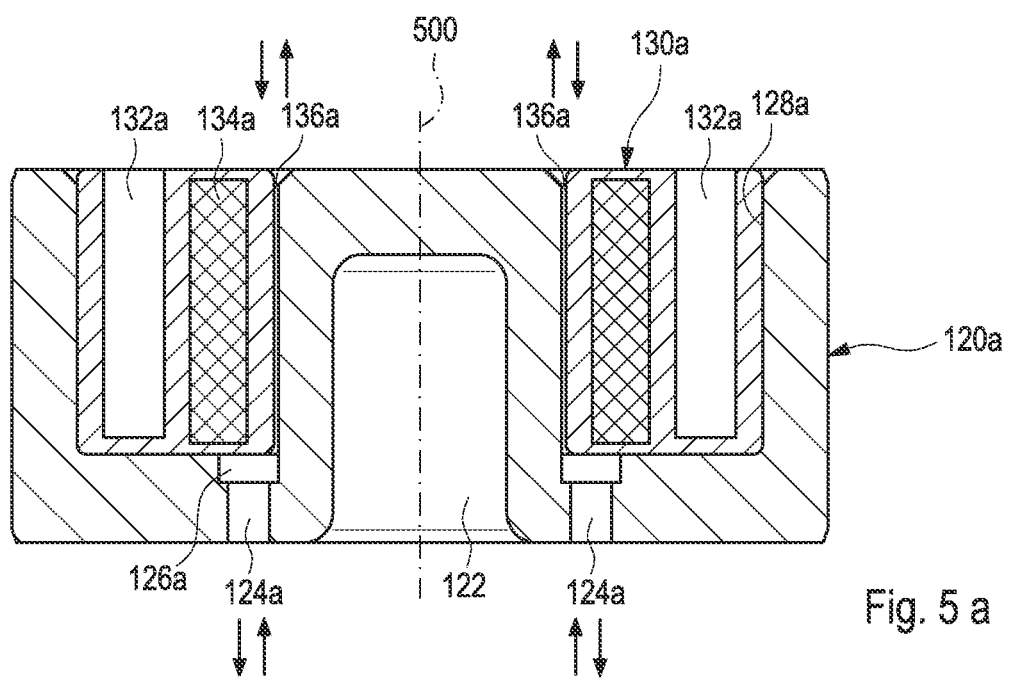
FIGS. 5a and 5b show in schematic representation a fifth embodiment of the system according to the disclosure to carry out a fifth embodiment of the method according to the disclosure.
Figure 5B:
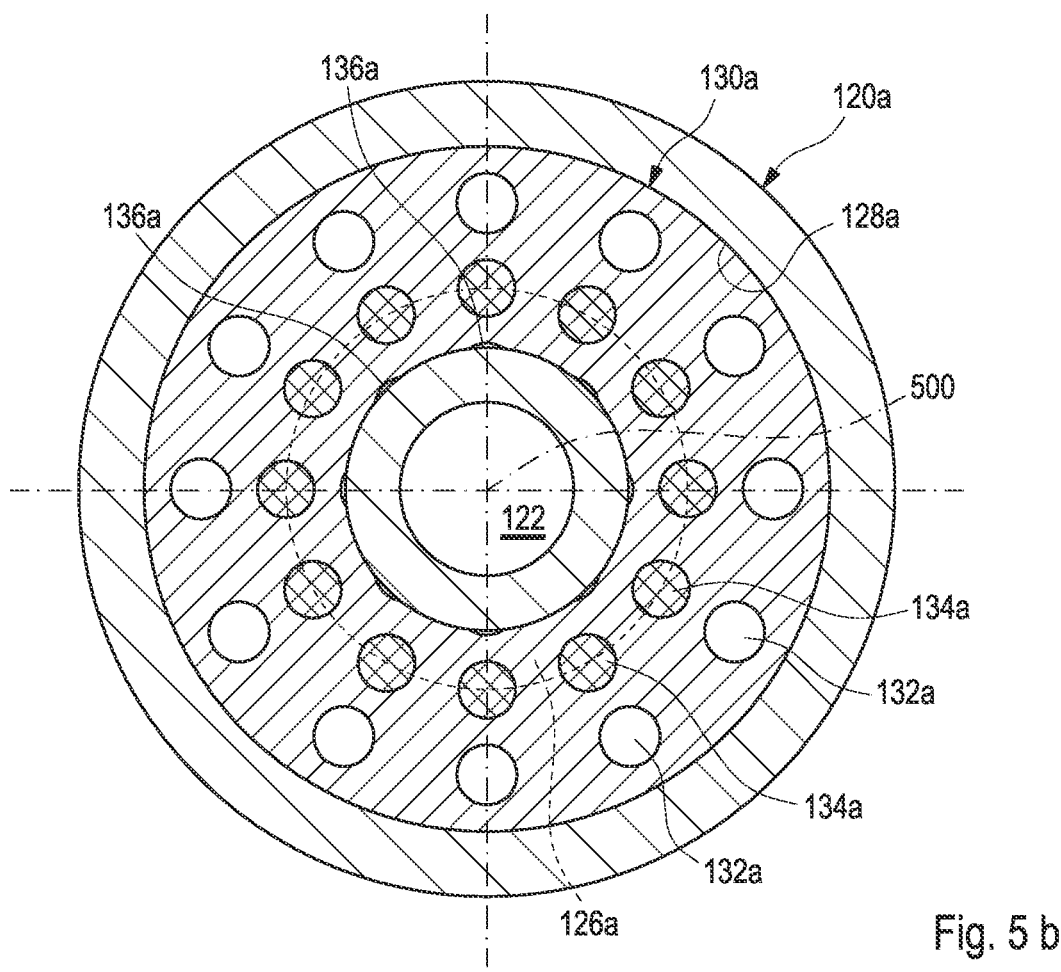
Figure 6:
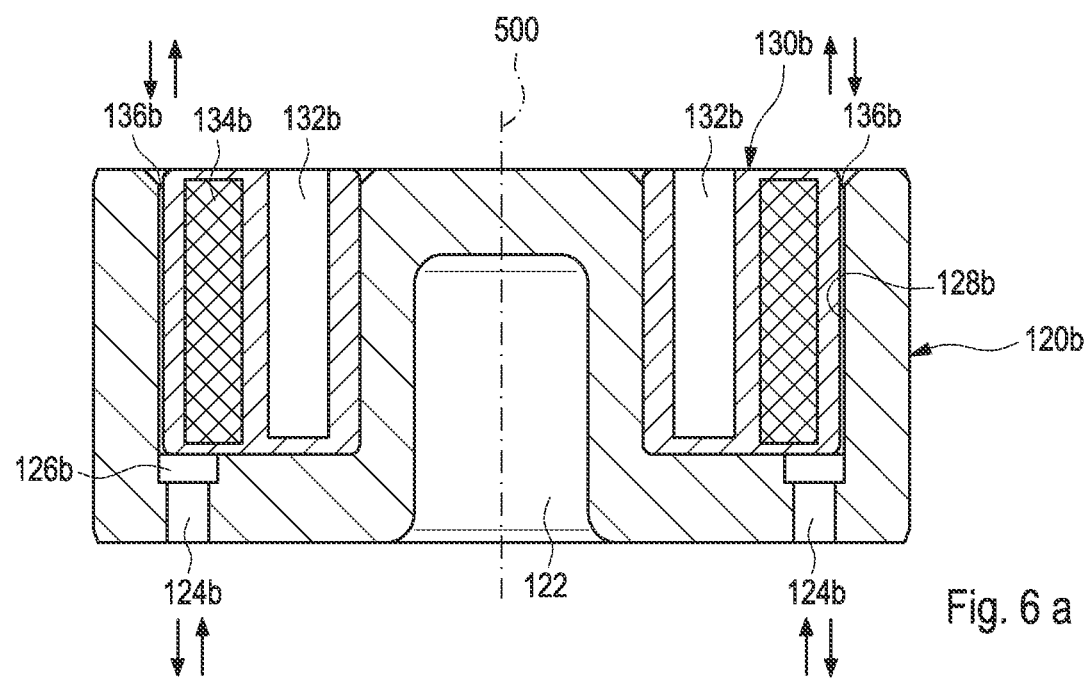
FIGS. 6a and 6b show in schematic representation a sixth embodiment of the system according to the disclosure to carry out a sixth embodiment of the method according to the disclosure.
Figure 6:
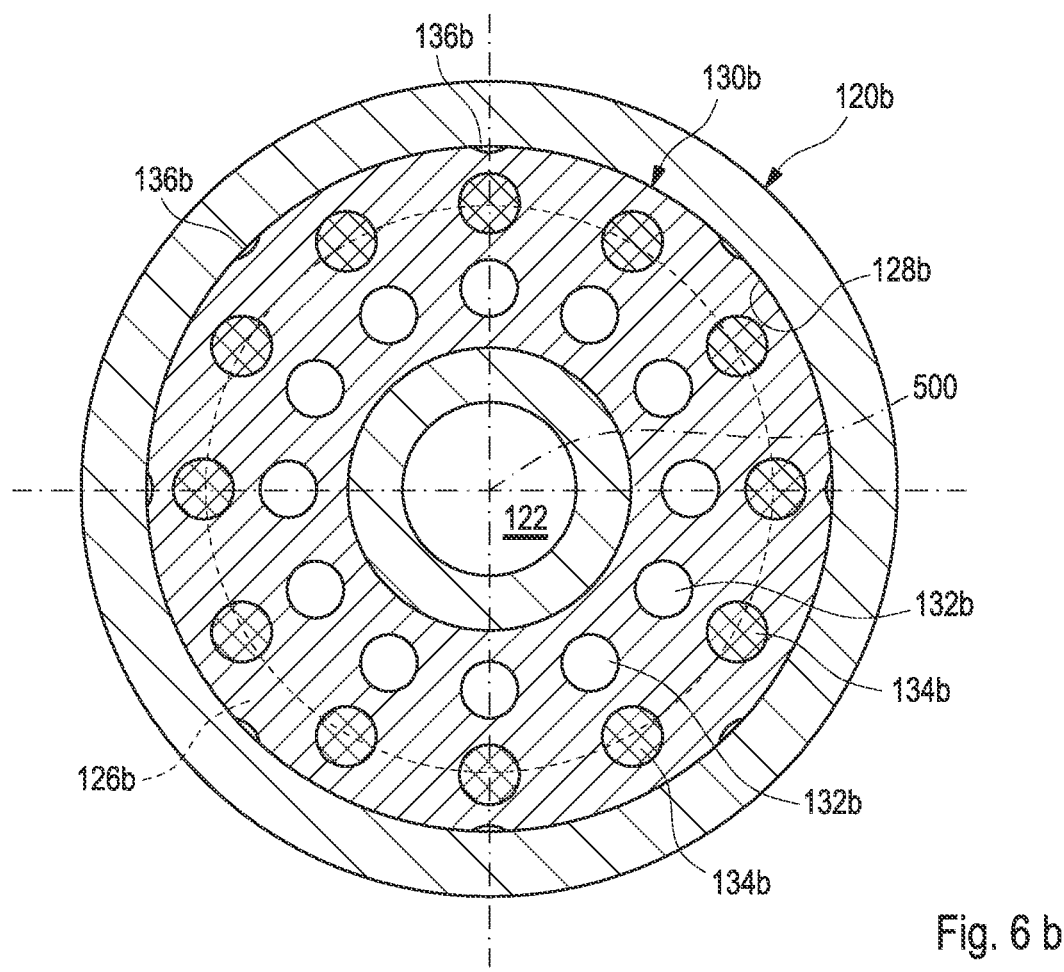

The third embodiment of the system according to the disclosure to carry out the third embodiment of the method according to the disclosure is shown schematically in FIG. 3a in a cross section through a central axis 300 and in FIG. 3b in a cross section perpendicular to the central axis 300. The fourth embodiment of the system according to the disclosure to carry out the fourth embodiment of the method according to the disclosure is shown schematically in FIG. 4a in a cross section through a central axis 300 and in FIG. 4b in a cross section perpendicular to the central axis 300. The fifth embodiment of the system according to the disclosure to carry out the fifth embodiment of the method according to the disclosure is shown schematically in FIG. 5a in a cross section through a central axis 500 and in FIG. 5b in a cross section perpendicular to the central axis 500. The sixth embodiment of the system according to the disclosure to carry out the sixth embodiment of the method according to the disclosure is shown schematically in FIG. 6a in a cross section through a central axis 500 and in FIG. 6b in a cross section perpendicular to the central axis 500.

The third, fourth, fifth and sixth embodiment of the system each comprise a carrier body 20a, 20b, 120a, 120b, which can turn about the respective central axis 300, 500. Moreover, each carrier body 20a, 20b, 120a, 120b comprises a central axial borehole 22 and multiple axially oriented decentral boreholes as transport ducts 24a, 24b, 124a, 124b, which are regularly arranged about the central axis 300, 500. Moreover, each carrier body 20a, 20b, 120a, 120b has a cylindrical envelope or annular recess 28a, 28b, 128a, 128b to receive an elastically deformable and rotationally symmetrical main body 30a, 30b, 130a, 130b as the regulating device, which is arranged therein. An inner section of the carrier body 20a, 20b, 120a, 120b is coaxially enclosed by the recess 28a, 28b, 128a, 128b and the main body 30a, 30b, 130a, 130b received in it. Moreover, an outer section of the carrier body 20a, 20b, 120a, 120b coaxially encloses the recess 28a, 28b, 128a, 128b and the main body 30a, 30b, 130a, 130b received therein.

It is proposed that in the third, fourth, fifth and sixth embodiment each main body 30a, 30b, 130a, 130b comprises multiple deformation regions 32a, 32b, 132a, 132b, which are distributed in angle-dependent or regular manner about the axis 300, 500, each deformation region 32a, 32b, 132a, 132b being formed here as a borehole and/or duct in the main body 30a, 30b, 130a, 130b and thus each enclosing a cylinder-shaped cavity. Each decentral borehole or a corresponding transport duct 24a, 24b, 124a, 124b in the carrier body 20a, 20b, 120a, 120b is also formed as an axial prolongation of the annular recess 28a, 28b, 128a, 128b.

In the third and fourth embodiment of the system, yet another rotationally symmetrical accessory body 34a, 34b is integrated in the main body 30a, 30b, this accessory body 34a, 34b having a different elasticity than the main body 30a, 30b, for example, the elasticity of the accessory body 34a, 34b is less than the elasticity of the main body 30a, 30b, and/or the density of the accessory body 34a, 34b being, for example, greater than the density of the main body 30a, 30b. Furthermore, in the third embodiment of the system the accessory body 34a has less radial distance from the central axis 300 than each deformation region 32a. On the other hand, in the fourth embodiment of the system the accessory body 34b has a greater radial distance from the central axis 300 than each deformation region 32b.

In the fifth and sixth embodiment of the system it is proposed that multiple axially oriented mass bodies 134a, 134b are integrated in the main body 130a, 130b or arranged therein and distributed in regular angular manner about the axis 500. Each mass body 134a, 134b as one embodiment of an accessory body in the main body 130a, 130b usually has less elasticity than the main body 130a, 130b and/or a greater density than the main body 130a, 130b. Furthermore, in the fifth embodiment of the system each mass body 134a has less radial distance from the central axis 500 than each deformation region 132a. On the other hand, in the sixth embodiment of the system each mass body 134b has a greater radial distance from the central axis 500 than each deformation region 132b.

In the third, fourth, fifth and sixth embodiment multiple axially oriented through-passage openings 36a, 36b, 136a, 136b are provided, each time being located between the main body 30a, 30b, 130a, 130b and the carrier body 20a, 20b, 120a, 120b and being distributed in regular angle-dependent manner about the axis 300, 500, each through-passage opening 36a, 36b, 136a, 136b having a cross sectional surface whose normal vector is oriented or directed parallel to the axis 300, 500, and each through-passage opening 36a, 36b, 136a, 136b being associated with a transport duct 24a, 24b, 124a, 124b and formed as an axial prolongation of the respective transport duct 24a, 24b, 124a, 124b. Between each through-passage opening 36a, 36b, 136a, 136b and each transport duct 24a, 24b, 124a, 124b there is furthermore arranged in the carrier body 20a, 20b, 120a, 120b a cylinder envelope-shaped or annular transport duct 26a, 26b, 126a, 126b and thus an annular duct, which coaxially encloses the axis 300, 500.

In this regard, it is proposed in the third and fifth embodiments of the system that each through-passage opening 36a, 136a is enclosed by the main body 30a, 130a, being arranged between a cylinder-shaped inner wall of the main body 30a, 130a and a cylinder-shaped outer wall of the inner section of the carrier body 20a, 120a and having less distance from the axis 300, 500 than the main body 30a, 130a. On the other hand, in the fourth and sixth embodiments of the system, it is proposed that the through-passage openings 36b, 136b enclose the main body 30b, 130b, each through-passage opening 36b, 136b being arranged between a cylinder-shaped outer wall of the main body 30b, 130b and a cylinder-shaped inner wall of the outer section of the carrier body 20b, 120b and having a greater distance from the axis 300, 500 than the main body 30b, 130b.

During operation of the third, fourth, fifth, and sixth embodiment of the system and thus in the, fourth, fifth, and sixth embodiment of the method according to the disclosure, the main body 30a, 30b, 130a, 130b is elastically deformed in the radial direction by virtue of a rotation about the central axis 300, 500 and is forced outward and away from the axis 300, 500 by centrifugal force. In the third and fifth embodiment of the system and the method, each cross sectional surface of a through-passage opening 36a, 136a is increased outward in the radial direction, so that the pressure of the fluid is reduced by the increased through-passage opening 36a, 136a and/or the volume flow rate of the fluid is increased through the increased through-passage opening 36a, 136a. On the other hand, in the fourth and sixth embodiment of the system and the method, each cross sectional surface of a through-passage opening 36b, 136b is decreased or reduced outward in the radial direction, so that the pressure of the fluid is increased by the decreased through-passage opening 36b, 136b and/or the volume flow rate of the fluid is throttled by the decreased through-passage opening 36b, 136b.

It is possible for the fluid to stream or flow through the respective system in a first or an opposite second direction, as indicated by arrows each time in FIGS. 3 to 6.

Figure 7:
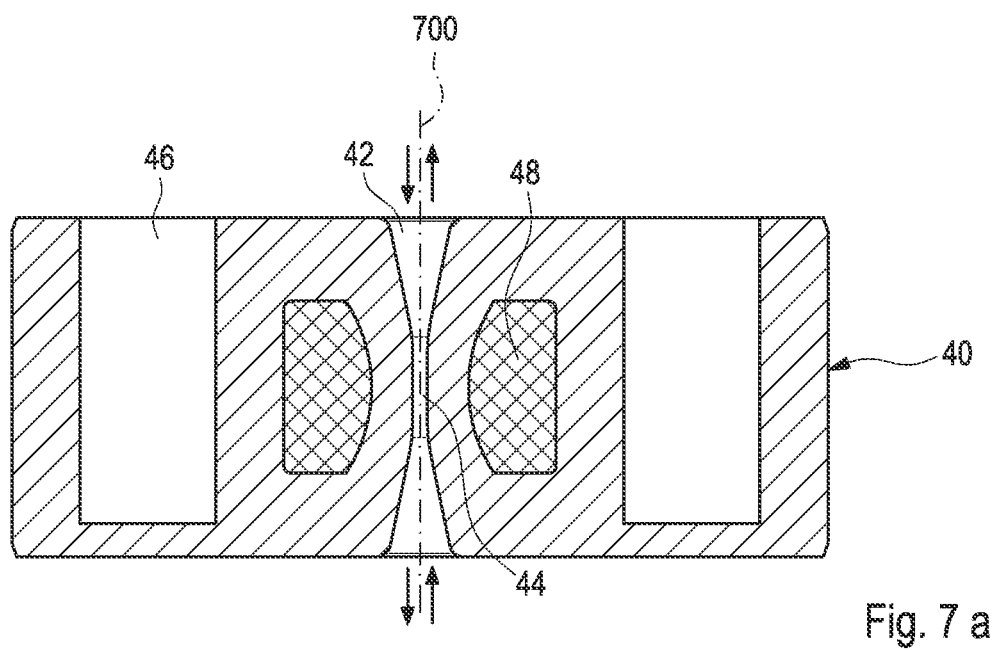
FIGS. 7a and 7b show in schematic representation a seventh embodiment of the system according to the disclosure to carry out a seventh embodiment of the method according to the disclosure.
Figure 7:
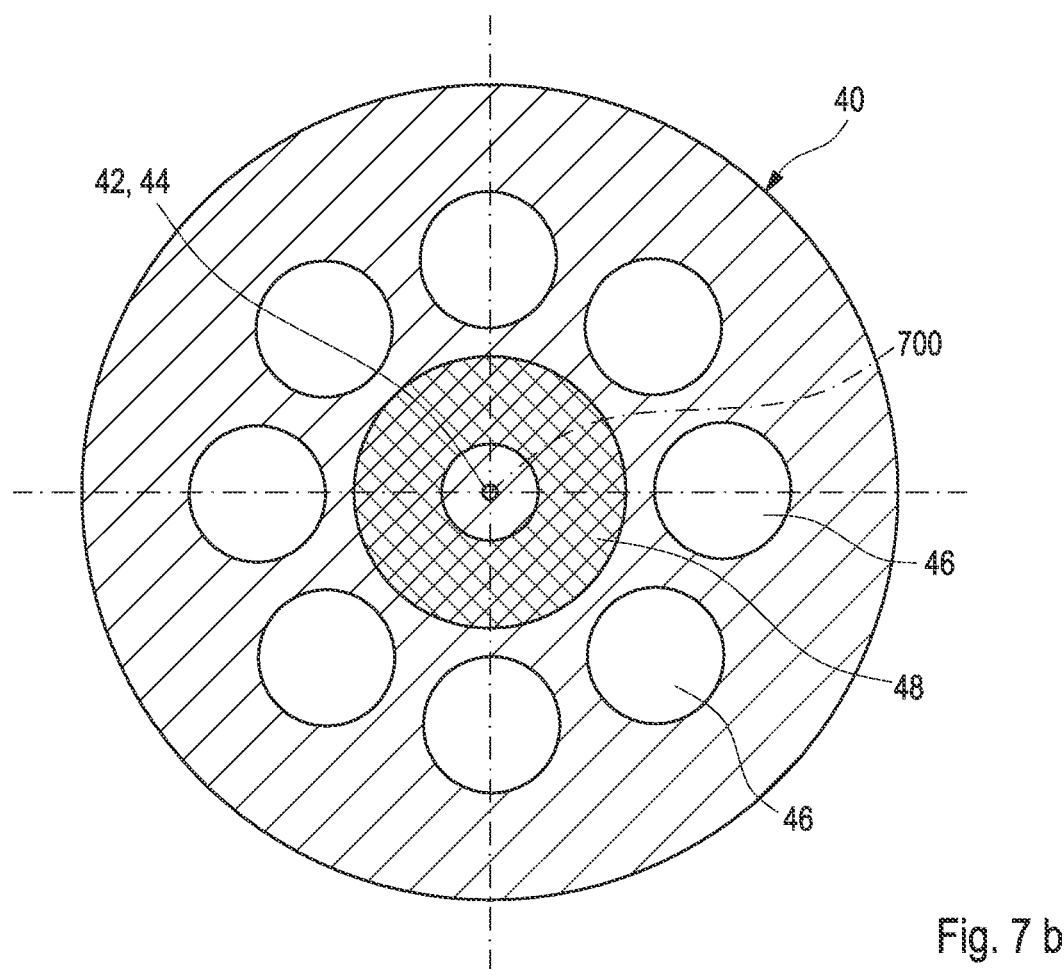
Figure 8:
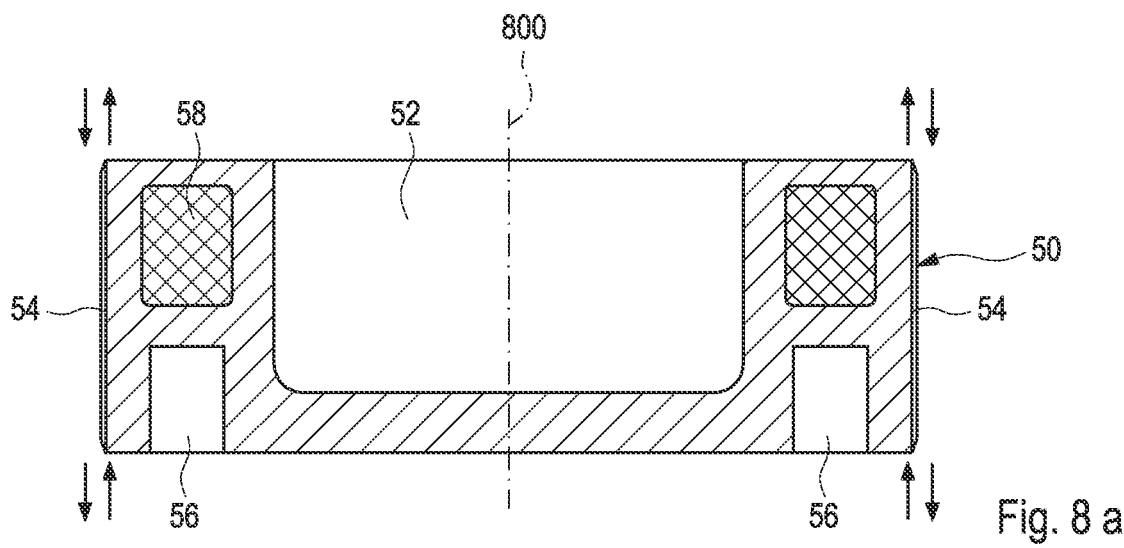
FIGS. 8a and 8b show in schematic representation an eighth embodiment of the system according to the disclosure to carry out an eighth embodiment of the method according to the disclosure.
Figure 8:
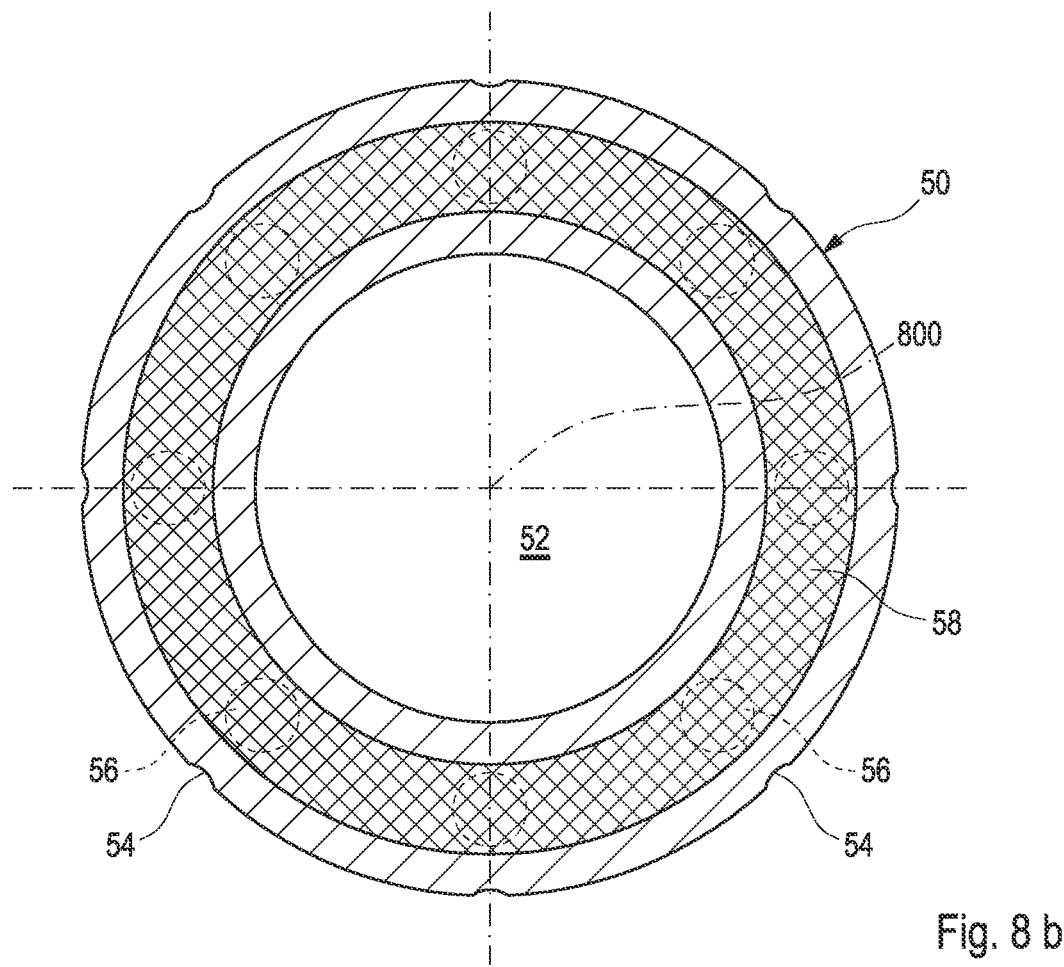
Figure 9:
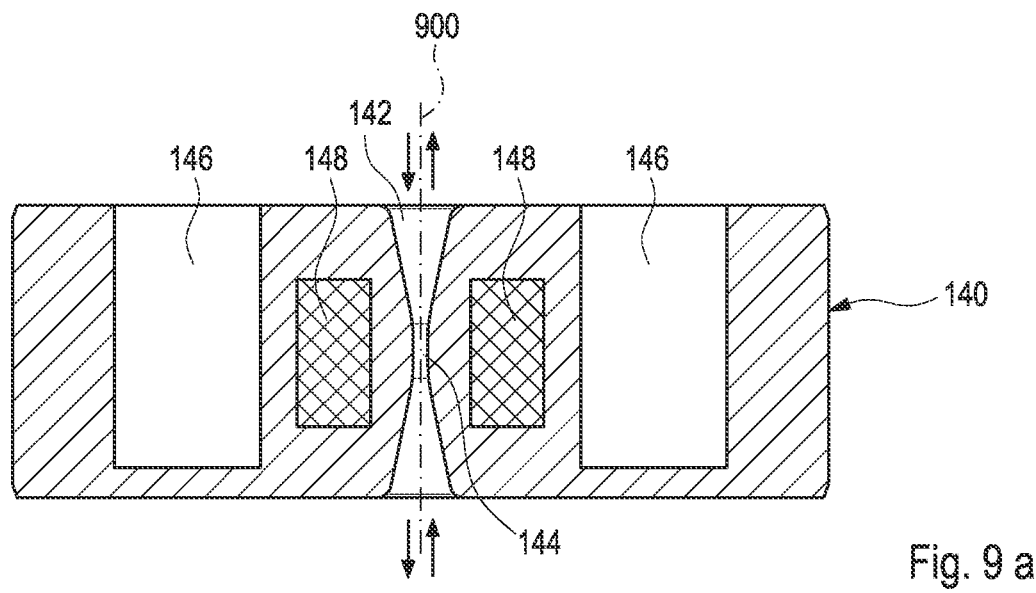
FIGS. 9a and 9b show in schematic representation a ninth embodiment of the system according to the disclosure to carry out a ninth embodiment of the method according to the disclosure.
Figure 9:
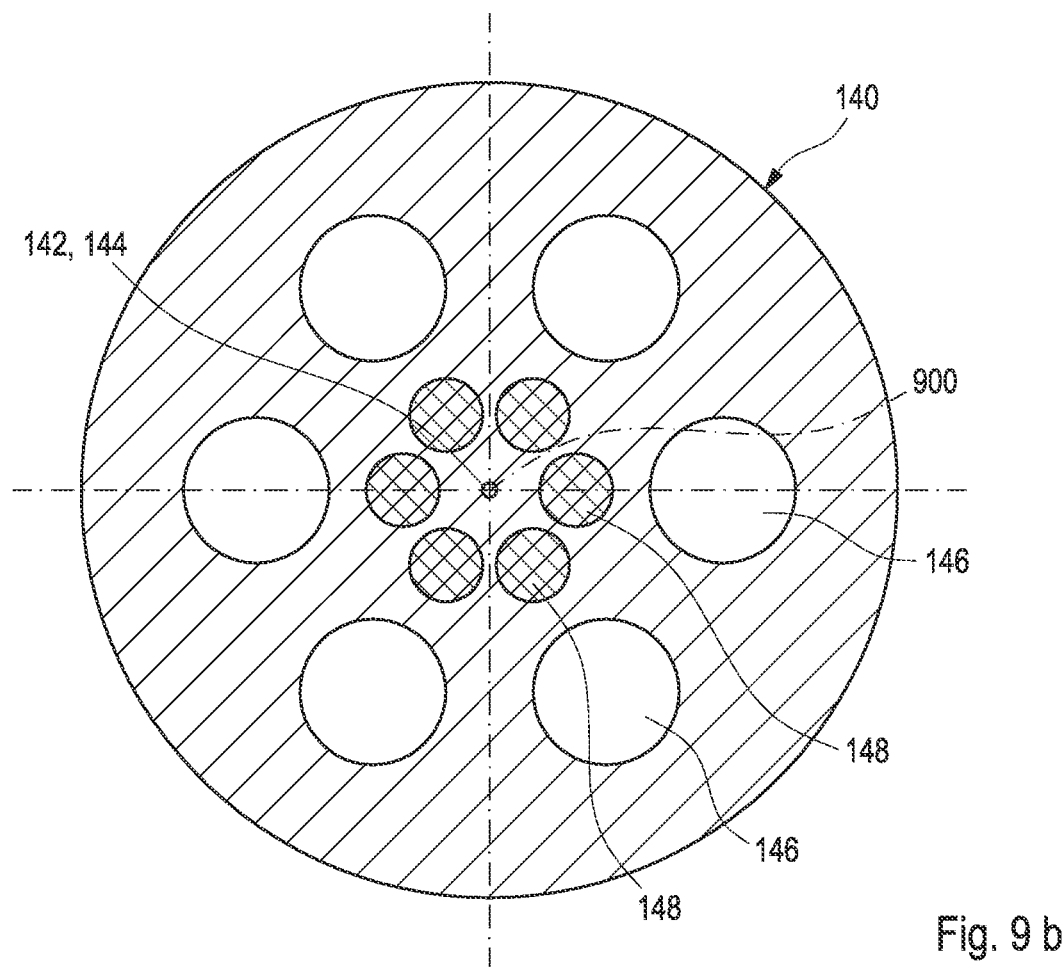
Figure 10:
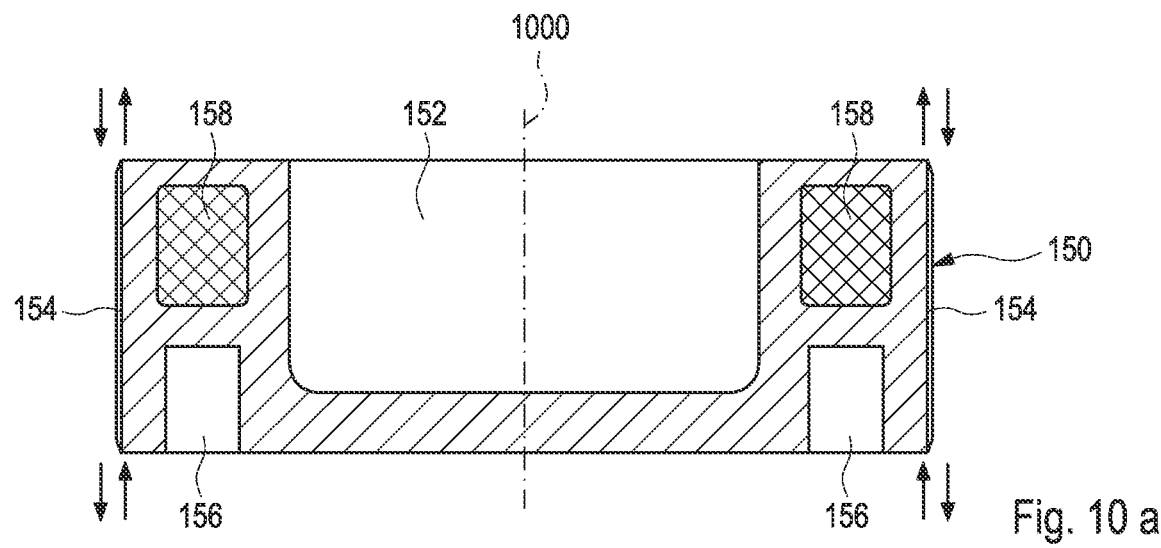
FIGS. 10a and 10b show in schematic representation a tenth embodiment of the system according to the disclosure to carry out a tenth embodiment of the method according to the disclosure.
Figure 10:
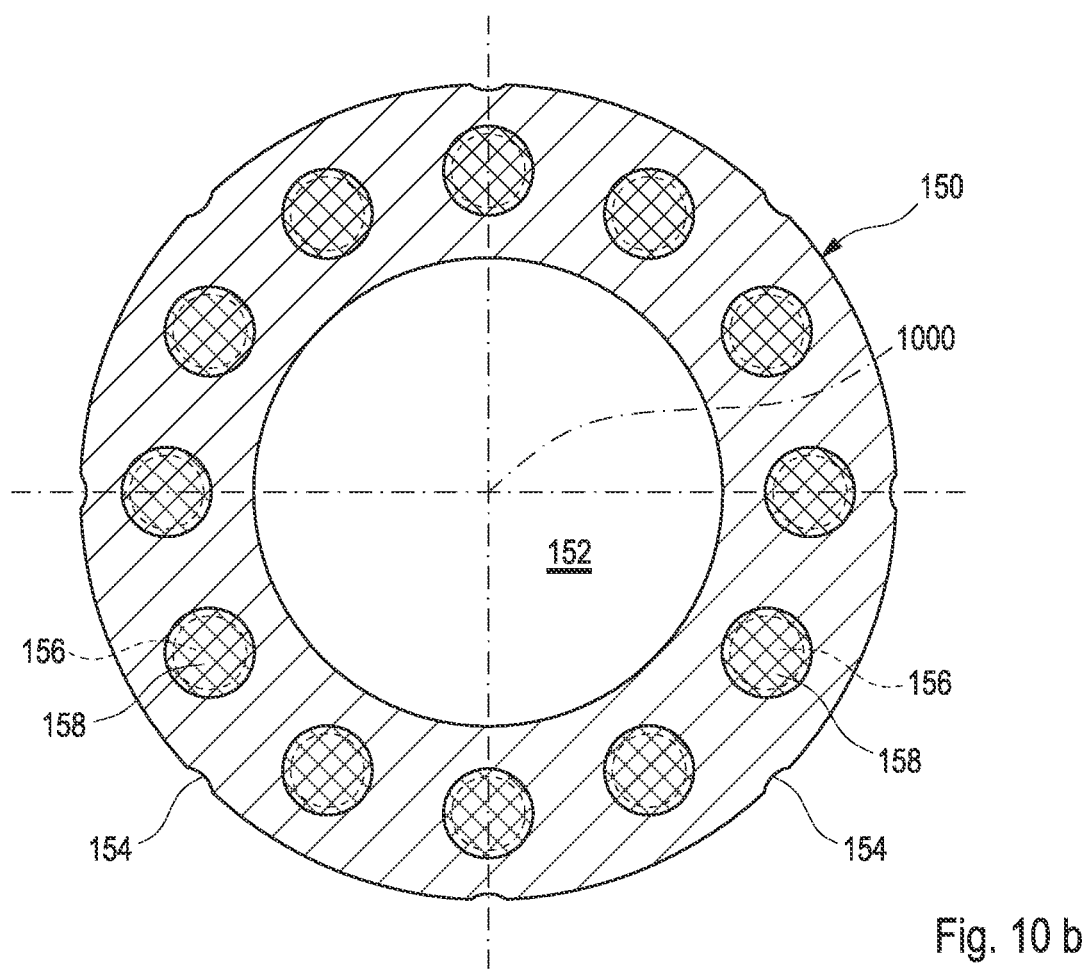

The seventh embodiment of the system according to the disclosure to carry out the seventh embodiment of the method according to the disclosure is shown schematically in FIG. 7a in a cross section through a central axis 700 and in FIG. 7b in a cross section perpendicular to the central axis 700. The eighth embodiment of the system according to the disclosure to carry out the eighth embodiment of the method according to the disclosure is shown schematically in FIG. 8a in a cross section through a central axis 800 and in FIG. 8b in a cross section perpendicular to the central axis 800. The ninth embodiment of the system according to the disclosure to carry out the ninth embodiment of the method according to the disclosure is shown schematically in FIG. 9a in a cross section through a central axis 900 and in FIG. 9b in a cross section perpendicular to the central axis 900. The tenth embodiment of the system according to the disclosure to carry out the tenth embodiment of the method according to the disclosure is shown schematically in FIG. 10a in a cross section through a central axis 1000 and in FIG. 10b in a cross section perpendicular to the central axis 1000.

The seventh, eighth, ninth and tenth embodiment of the system comprises an elastically deformable and rotationally symmetrical main body 40, 50, 140, 150 as the regulating device. Moreover, the main body 40, 50, 140, 150 comprises multiple hollow deformation regions 46, 56, 146, 156, formed here as boreholes and/or as ducts, which are distributed in regular manner about the central axis 700, 800, 900, 1000.

In addition, the seventh and eighth embodiment comprises an annular accessory body 48, 58, coaxially enclosing the central axis 700, 800, this accessory body 48, 58 having a different elasticity than the main body 40, 50, for example, the elasticity of the accessory body 48, 58 is less than the elasticity of the main body 40, 50, and/or the density of the accessory body 48, 58 is, for example, greater than the density of the main body 40, 50. In the seventh embodiment, the accessory body 48 has less radial distance from the central axis 700, 800 than each deformation region 46. By contrast, in the eighth embodiment, the accessory body 58 and each deformation region 56 have the same radial distance from the central axis 700, 800.

In the ninth and tenth embodiment of the system, multiple axially oriented mass bodies 148, 158 are integrated in the main body 140, 150 or arranged therein and being distributed in regular angle-dependent manner about the axis 900, 1000. Each mass body 148, 158 as a formation of an accessory body in the main body 140, 150 usually has less elasticity than the main body 140, 150 and/or a greater density than the main body 140, 150. In the ninth embodiment, each mass body 148 has less radial distance from the central axis 900, 1000 than each deformation region 146. By contrast, in the tenth embodiment, the mass body 158 and each deformation region 156 have the same radial distance from the central axis 900, 1000.

In the seventh and ninth embodiment of the system, a central axial regulating duct is led through the main body 40, 140 as a further transport duct 42, 142 for the fluid, being elastically deformable like the main body 40, 140 and having here a through-passage opening 44, 144 with a cross sectional surface whose normal vector is oriented parallel to the axis 700, 900. The size of the cross sectional surface during operation of the seventh or ninth embodiment of the system when carrying out the seventh or ninth embodiment of the method increases with increasing rotary speed by virtue of a rotary speed-dependent radial extension of the main body 40, 140, whereupon the volume flow rate of the fluid through the through-passage opening 44, 144 is increased and/or the pressure of the fluid flowing through is decreased.

In the eighth and tenth embodiment of the system, the main body 50, 150 is arranged in a not otherwise represented rigid carrier body, wherein a cylinder-shaped outer wall of the main body 50, 150 is enclosed by a cylinder-shaped inner wall of the carrier body. Multiple through-passage openings 54, 154 are arranged between the main body 50, 150 and the carrier body, being distributed evenly in angular-dependent manner about the central axis 800, 1000, each through-passage opening 54, 154 having a cross sectional surface whose normal vector is oriented parallel to the central axis 800, 1000. It is possible for each through-passage opening 54, 154 to decrease, with increasing rotary speed during operation of the eighth or tenth embodiment of the system when carrying out the eighth or tenth embodiment of the method, the cross sectional surface of each through-passage opening 54, 154 on account of a rotary speed-dependent radial extension of the main body 50, 150 with respect to the carrier body surrounding it, whereupon the volume flow rate of the fluid through the respective through-passage opening 54, 154 is decreased or reduced and/or the pressure of the fluid flowing through it is increased.

It is also possible for the fluid to stream or flow through the respective system in a first or an opposite second direction, as indicated by arrows each time in FIGS. 7 to 10.

In the embodiments shown with the aid of FIGS. 3 to 10, the increasing or throttling of the pressure and/or the volume flow rate is dependent on a material property of the respective main body 30a, 30b, 40, 50, 130a, 130b, 140, 150 as a component and a distribution of the deformation regions 32a, 32b, 46, 56, 132a, 132a, 146, 156 arranged therein and/or of the accessory body 34a, 34b, 48, 58 integrated therein as a component or of the mass body 134a, 134b, 148, 158 integrated therein as components and their material properties. A material or material-specific property of the respectively mentioned component is, e.g., the elasticity, the Shore hardness, the biasing force, the deformation capability, the mass and/or the density. Moreover, the geometrical and thus the spatial distribution of the respective component, for example, its mass, elasticity and/or density, with respect to the central axis 300, 500, 700, 800, 900, 1000, should be taken into account. Moreover, each rotary speed-dependent cross-sectional surface of a respective through-passage opening 36a, 36b, 44, 54, 136a, 136b, 144, 154 within the main body 40, 140 or between the main body 30a, 30b, 50, 130a, 130b, 150 and the respective carrier body 20a, 20b, 120a, 120b should be taken into account. It is furthermore possible for each main body 30a, 30b, 40, 50, 130a, 130b, 140, 150, having a constant cylinder-shaped outer wall and/or inner wall, alternatively has a radially changing, e.g., a nonconstant or truncated conical or conical outer wall and/or inner wall. The number of through-passage openings 36a, 36b, 44, 54, 136a, 136b, 144, 154 is variable, and these can be arranged symmetrically or asymmetrically with respect to the axis 300, 500, 700, 800, 900, 1000, as described herein.

A regulating and/or adjusting, as well as an intentional changing of the cross sectional surface of each through-passage opening 36a, 36b, 44, 54, 136a, 136b, 144, 154 whose normal vector is oriented parallel to the axis 300, 500, 700, 800, 900, 1000 will be either increased or decreased in rotary speed-dependent manner, depending on the embodiment of the system.

German patent application no. 10 2022 106609.6, filed Mar. 22, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for regulating a flow of a fluid, comprising: a regulating device having a central axial transport duct that extends along a central axis of the regulating device, wherein the regulating device is adapted to establish at least one through-passage opening for the fluid, wherein each of the at least one through-passage opening is situated between two respective transport ducts for the fluid, including a respective radial transport duct that extends radially in a direction perpendicular to the central axis and that directly intersects with the central axial transport duct, wherein the regulating device further includes a respective piston provided in each respective radial transport duct, each respective piston including a respective axial passage extending therethrough to enable fluid to flow axially through each respective piston, wherein a normal vector of a cross sectional area of the at least one through-passage opening is oriented parallel to the central axis, and wherein a size of the cross sectional area is adjusted in dependence on a rotary speed of the regulating device turning about the central axis.

2. The system according to claim 1, wherein the regulating device comprises a rigid carrier body in which the central axial transport ducts and the two respective transport ducts are formed.

3. The system according to claim 1, wherein the two respective transport ducts further include a respective transport duct that is oriented parallel to the central axis.

4. The system according to claim 1, wherein the regulating device further comprises a respective spring associated with each respective piston, wherein each respective piston is stressed by the respective spring perpendicular to the central axis and is displaceable relative to the at least one through-passage opening.

5. A method for regulating a flow of a fluid, comprising: providing a regulating device having a central axial transport duct that extends along a central axis of the regulating device, wherein the regulating device is adapted to establish at least one through-passage opening for the fluid, wherein each of the at least one through-passage opening is arranged between two transport ducts for the fluid, including a respective radial transport duct that extends radially in a direction perpendicular to the central axis and that directly intersects with the central axial transport duct, wherein the regulating device further includes a respective piston provided in each respective radial transport duct, each respective piston including a respective axial passage extending therethrough to enable fluid to flow axially through each respective piston, and wherein a normal vector of a cross sectional area of the at least one through-passage opening is oriented parallel to the central axis; and adjusting a size of the cross sectional area of the at least one through-passage opening in dependence on a rotary speed of the regulating device turning about the central axis.

* * * * *